United States Patent
Caro et al.

(10) Patent No.: US 8,206,771 B2
(45) Date of Patent: Jun. 26, 2012

(54) PROCESS FOR PREPARING A DAIRY BASED SAUCE

(75) Inventors: Catherine Caro, Crawley (GB); Bilal Ahmed Motala, Crawley (GB); Robert Karl Wagner, Meyrin (CH)

(73) Assignee: Conopco, Inc., Englewood Cliffs, NJ (US)

( * ) Notice: Subject to any disclaimer, the term of this patent is extended or adjusted under 35 U.S.C. 154(b) by 1203 days.

(21) Appl. No.: 11/547,095

(22) PCT Filed: Mar. 4, 2005

(86) PCT No.: PCT/EP2005/002373
§ 371 (c)(1),
(2), (4) Date: Sep. 29, 2006

(87) PCT Pub. No.: WO2005/094616
PCT Pub. Date: Oct. 13, 2005

(65) Prior Publication Data
US 2008/0274257 A1    Nov. 6, 2008

(30) Foreign Application Priority Data

Mar. 29, 2004    (EP) .................................... 04251835

(51) Int. Cl.
*A23L 3/00*    (2006.01)
*A23C 19/00*    (2006.01)

(52) U.S. Cl. ...................................... 426/589; 426/570

(58) Field of Classification Search .................... 426/589
See application file for complete search history.

(56) References Cited

U.S. PATENT DOCUMENTS

| 3,314,798 A | * | 4/1967 | Graves .......................... 426/586 |
| 4,087,560 A | | 5/1978 | Yao et al. |
| 4,612,197 A | | 9/1986 | Postner |
| 4,689,239 A | | 8/1987 | Rispoli et al. |
| 4,929,456 A | * | 5/1990 | Bejarano-Wallens et al. .. 426/99 |
| 5,320,860 A | * | 6/1994 | Duval et al. .................... 426/582 |
| 6,231,913 B1 | * | 5/2001 | Schwimmer et al. ......... 426/605 |

FOREIGN PATENT DOCUMENTS

| EP | 0 970 620 | 1/2000 |
| FR | 2 068 674 | 8/1971 |
| WO | 98/53694 | 12/1998 |
| WO | 01/10228 | 2/2001 |

OTHER PUBLICATIONS

*European Search Report*, EP 04 25 2835, dated Sep. 20, 2004, 3 pp.
JP 10 136931, House Shokuhin Kogyo KK, May 26, 1998, XP002297095, abstract.
JP 11 225713, Nippon Flour Mills Co, Ltd., Aug. 24, 1999, XP002297096, abstract.

* cited by examiner

*Primary Examiner* — Jyoti Chawla
(74) *Attorney, Agent, or Firm* — Alan A. Bornstein

(57) ABSTRACT

A process for preparing a shelf-stable dairy-based sauce comprising oil/fat and a diary component (e.g. cheese or cream), which sauce is low in reducing sugars, and wherein the composition, prior to packing, is not subjected to temperatures above 50° C.

12 Claims, No Drawings

PROCESS FOR PREPARING A DAIRY BASED SAUCE

FIELD OF THE INVENTION

The present invention relates to a process for preparing a shelf stable dairy-based sauce. Dairy-based sauces are sauces conventionally containing a dairy ingredient such as cheese and/or cream and/or butter.

BACKGROUND OF THE INVENTION

Cheese sauces (i.e. emulsified sauces containing cheese and/or cheese flavour) and other dairy-based sauces such as cream-style sauces are popular e.g. with consumers having a western taste. Such sauces exist (apart from freshly made by consumer or chef, and disregarding dry sauce mixes) as fresh, chilled stable cheese sauces, pasteurised sauces or sterilised sauces.

DE 2058207 discloses cheese imitations and cheese imitation sauces comprising non-milk fat, milk protein, water, and optionally other components like emulsifier and stabiliser, but not containing any cheese, which products are prepared by mixing all ingredients, heat to about 60° C., pasteurise, and pack.

JP 3065543 discloses a seasoning sauce containing a milk material low in lactose. The products are prepared by mixing all ingredients, heated to about 85° C., pack and sterilise.

JP 11225713 discloses a retort white sauce comprising milk, and which composition contains not more than 3% lactose. The composition is prepared by preparing a roux, adding milk, heating to 95-98° C., optionally adding flavourings and/or starch, packing in a pouch or can followed by a retort treatment.

Fresh, chilled stable dairy-based sauces need to be stored in a cooling cabinet, and heave a limited shelf life of a few weeks. Such sauces usually have a good quality (flavour, colour, mouthfeel).

Pasteurised sauces usually rely on minimal heating, and prevent the outgrowth or harmful organisms by e.g. acidification (a known technique for preservation of e.g. tomato sauces and dressings). Such acidification technique may be acceptable in tomato sauces or dressings, it is less desired for cheese- or cream-style sauces, as the acidity does not combine very well with the overall desired taste profile of the cheese or cream-style sauces.

Sterilised dairy-based sauces rely on high temperature treatment for preservation, and may be shelf stable for several months at least. Such sauces suffer generally from off-taste and discoloration.

Chilled-stable dairy-based sauces are highly preferred over pasteurised and sterilised sauces, in particular regarding color and flavour, but are impractical in use due to the limited shelf life.

Thus, there is a need for shelf-stable dairy-based sauces having a good flavour, colour and mouthfeel. Preferably, such shelf-stable dairy-based sauces are more close to chilled stable dairy-based sauces regarding e.g. flavour and/or color and/or mouthfeel than existing shelf stable dairy-based sauces.

SUMMARY OF THE INVENTION

It was found that the above objectives can be met (at least in part) by a process for preparing a stable dairy-based sauce comprising fat and/or oil and a dairy component and wherein the sauce contains less than 2% of reducing sugars, which process involves the subsequent steps of:
(a) preparing a mixture containing all ingredients,
(b) packing,
further comprising a sterilisation step prior to or after step (b), and wherein the mixture, prior to packing is not subjected to temperatures above 50° C. (preferably not above 40° C.).

Step (a) may optionally be divided up in partial steps. Step (a) preferably comprises a homogenisation treatment. If sterilisation is carried out prior to packing, this will have to be another type of sterilisation than by heating, as the temperature should, prior to packing, not exceed 50° C.: e.g. ultra high pressure sterilisation may be employed, In the process as set out above, it is preferred that between steps (a) and (b) the mixture is subjected to de-aerating. It is also preferred that the sterilisation is carried out by rotary sterilisation. Preferably the packed products are subjected to retort sterilisation.

The dairy-based sauce in the above process preferably comprises (all percentages as weight percentage of the sauce):
  1-25% oil and/or fat,
  1-20% of diary component,
  0.5-5% modified starch,
  0.01-2% stabilising gum, preferably xanthan and/or carrageenan,
  0.1-5% emulsifier, preferably egg yolk,
  0.1-4% salt,
  50-85% water,
wherein the sauce contains less than 2% of reducing sugars.

In the sauce according to the invention, it is preferred that the oil and/or fat is fairly stable against oxidation. In that respect, it was preferred that of the oil and fat present in the formulation the amount PUFA (triglycerides of polyunsaturated fatty acids) is below 60%, more preferably below 30% (wt % of total fatty acids in triglycerides) and amount of triglycerides of fatty acids having 10-14 carbon atoms (C10-C14) is below 25%, more preferably below 20% (wt % of total fatty acids in triglycerides). A certain amount of monounsaturated fatty acids is preferred however: preferably of the oil and fat present the amount MUFA (monounsaturated fatty acids) is above-30% (wt % of total fatty acids in triglycerides), preferably above 40%. Suitable oils and fats in this connection are e.g. olive oil, palm oil, butter fat, or mixtures thereof, and it is preferred that in the present composition 20-100% of the fat/oil is of the fats/oils specified.

DETAILED DESCRIPTION OF THE INVENTION

In the formulations according to the invention, it is preferred that the sauce contains less than 1.5% reducing sugars, more preferably even less than 1% (weight % of total formulation). A typical reducing sugar present in conventional dairy components is lactose. Thus, it is preferred that the sauce according to the present invention is low in lactose. Consequently, it is preferred that part or all of the dairy component (s) in the formulations according to the invention are low-lactose dairy components. Preferably, the sauce according to the invention contains less than 1% lactose.

In the formulations according to the invention the dairy component may comprises cheese. Such cheese preferably comprises a low-lactose cheese. Preferred cheeses in this connection are (low lactose) parmesan, mozzarella, pecorino romano. In case cheese is present in the formulations according to the invention it is preferred that the formulation further comprising 0.05-2% of melting salts, preferably phosphates, phosphate salts, polyphosphates or mixtures thereof.

Next to or alternatively to cheese, the dairy component in the present invention may comprise comprises cream, single cream, whipping cream, double cream, soured cream, butter milk powder, caseinate, whey powder or mixtures thereof. Preferred in this connection are cream, whipping cream, or double cream, all containing at least 25% fat, preferably at least 35% fat.

It is preferred that the formulations according to the present invention contain less than 35% milk, preferably less than 25% milk, more preferably less than 15%. Preferably, the formulations are substantially free of milk.

The formulations according to the present invention may further comprise flavourings and/or non-reducing sugars. The sauces according to the invention can be seen as oil-in-water emulsions.

EXAMPLES

A creamy cheese sauce was prepared having the following net composition:
8% olive oil
0.4% xanthan gum
1% egg yolk
2% modified starch
0.7% salt
5% cheese (mixture of mascarpone, low lactose parmesan, pecorino)
0.2% polyphosphate salt
6% double cream
balance water.

The sauce was prepared by mixing all ingredients except cheese and double cream, homogenise, adding the (grated) cheese and double cream, fill in glass jars (so far all at room temperature), followed by rotary sterilisation.

The resulting product was a shelf-stable cheese sauce of good quality with a flavour and colour comparable to chilled stable cheese sauces.

The invention claimed is:

1. Process for preparing a stable dairy-based sauce comprising fat and/or oil and a dairy component and wherein the sauce contains less than 1.5% of reducing sugars, which process involves the subsequent steps of:
   (a) preparing a mixture containing all the following ingredients:
      (i) 1-25% oil and/or fat, on the basis of weight of the sauce,
      (ii) 1-20% of dairy component, on the basis of weight of the sauce, wherein the dairy component comprises cheese or a mixture of cheese and cream,
      (iii) 0.5-5% modified starch, on the basis of weight of the sauce,
      (iv) 0.01-2% xanthan gum and/or carrageenan, on the basis of weight of the sauce,
      (v) 0.1-5% egg yolk emulsifier, on the basis of weight of the sauce,
      (vi) 0.1-4% salt, on the basis of weight of the sauce,
      (vii) 50-85% water, on the basis of weight of the sauce, wherein the sauce contains less than 1% of lactose
   (b) packing, further comprising a sterilization step after step (b), and wherein the mixture, prior to packing is not subjected to temperatures above 40° C.; and
   wherein between steps (a) and (b) the mixture is subjected to de-aerating.

2. Process according to claim 1, wherein the sterilization is carried out by rotary sterilization.

3. Process according to claim 1, wherein the sauce contains less than 1% of reducing sugars.

4. Process according to claim 1, wherein the cheese comprises parmesan, mozzarella, pecorino romano; and further comprises 0.05-2% of melting salts selected from the group consisting of phosphates, phosphate salts, polyphosphates, and mixtures thereof.

5. Process according to claim 1, wherein the cream contains at least 35% fat.

6. Process according to claim 1, wherein of the oil and fat present, the amount of triglycerides of polyunsaturated fatty acids is below 30% by wt % of total fatty acids in triglycerides and amount of triglycerides of fatty acids having 10-14 carbon atoms (C10-C14) is below 20% by wt % of total fatty acids in triglycerides.

7. Process according to claim 1, wherein of the oil and fat present the amount of triglycerides of monounsaturated fatty acids is above 30% by wt % of total fatty acids in triglycerides.

8. Process according to claim 1, wherein the oil/fat comprises 20-100% wt, based on total oil/fat content of olive oil, palm oil, butter fat, or mixtures thereof.

9. Process according to claim 1, wherein the sauce contains less than 25% milk.

10. Process according to claim 1, wherein the dairy component consists of a mixture of cheese and a cream having a fat content of at least 35%.

11. Process according to claim 1, wherein the process does not include acidification.

12. Process according to claim 1, wherein the oil/fat is olive oil.

* * * * *